United States Patent
Li

(10) Patent No.: US 6,278,216 B1
(45) Date of Patent: Aug. 21, 2001

(54) VEHICLE MOTOR

(76) Inventor: I-Ho Li, 5F, No. 21, Lane 16, Sec. 2, Chung Shan N. Rd., Taipei (TW)

( * ) Notice: Subject to any disclaimer, the term of this patent is extended or adjusted under 35 U.S.C. 154(b) by 0 days.

(21) Appl. No.: 09/327,187

(22) Filed: Jun. 7, 1999

(51) Int. Cl.[7] .................................................. H02K 1/12
(52) U.S. Cl. .......................................... 310/254; 310/67 A
(58) Field of Search .............................. 310/67 A, 67 R, 310/156, 261, 254, 75 C, 198, 199, 266, 268; 29/596–598; 180/65.5, 220

(56) References Cited

U.S. PATENT DOCUMENTS

| | | | |
|---|---|---|---|
| 4,394,594 | * 7/1983 | Schmider et al. | 310/68 R |
| 4,769,567 | * 9/1988 | Kurauchi et al. | 310/156 |
| 4,959,578 | * 9/1990 | Varga | 310/268 |
| 5,212,419 | * 5/1993 | Fisher et al. | 310/254 |
| 5,345,133 | * 9/1994 | Satake | 310/266 |
| 5,370,200 | * 12/1994 | Takata | 180/206 |
| 5,450,915 | * 9/1995 | Li | 180/65.5 |
| 5,646,467 | * 7/1997 | Floresta et al. | 310/268 |
| 5,751,089 | * 5/1998 | Stridsberg | 310/266 |
| 5,793,137 | * 8/1998 | Smith | 310/114 |
| 5,942,873 | * 8/1999 | Nakano | 310/156 |
| 6,011,337 | * 1/2000 | Lin et al. | 310/156 |

* cited by examiner

Primary Examiner—Ngoc-Tran Nguyen
(74) Attorney, Agent, or Firm—Bacon & Thomas, PLLC

(57) ABSTRACT

A vehicle motor for a motor bicycle, which includes a wheel hub, a rotor, a stator, and a wheel axle, wherein the rotor includes a yoke ring fixedly mounted inside the wheel hub and a plurality of magnets equiangularly arranged inside the yoke ring; the stator includes a disk body fixedly mounted on the wheel axle and suspended inside the wheel hub within the rotor, and a silicon steel stack fixedly mounted around the periphery of the disk body, the silicon steel stack having a plurality T-teeth, the number of the T-teeth being not a common multiple of the number of the magnets so that vibration and cogging torque can be minimized during rotary motion of the rotor relative to the stator, and a three-phase winding mounted on the T-teeth of the silicon steel stack of the disk stator.

13 Claims, 11 Drawing Sheets

US 6,278,216 B1

VEHICLE MOTOR

BACKGROUND OF THE INVENTION (a) Field of the Invention

The present invention relates to a vehicle motor, and more particularly to a brushless motor for use in a motor bicycle which minimizes vibration and cogging torque during rotary motion of the rotor.

(b) Description of the Prior Art

Regular bicycles are used as sports equipment or short distance transportation vehicle means. Because riding a bicycle consumes much effort, a bicycle is not suitable for use as a long distance transportation vehicle. In recent years, various motor bicycles have been developed for use as practical transportation vehicle means. U.S. Pat. No. 5,581, 136 teaches the use of a vehicle motor in a bicycle. Various brushless motors have been disclosed for use in motor bicycles. However, these brushless motors, still do not satisfactorily function because they cannot eliminate a cogging torque. These brushless motors commonly comprise a stator and a rotor. The rotor comprises a plurality of equiangularly spaced magnets. The stator is comprised of a silicon steel stack having a plurality of T-teeth around the periphery, and a winding mounted on the T-teeth. The number of the T-teeth is a common multiple of the number of the magnets at the rotor, or equal to the number of the magnets. When one magnetic pole of the rotor is aligned with the center of the magnetic field of one magnetic pole of the winding at the stator, a dead angle is produced, causing the rotor to vibrate. For example, if the number of T-teeth of the stator of a two-phase motor is 4, the rotor has N pole and S pole, and a dead angle is produced when upon each 90° rotation of the rotor. If the number of T-teeth of the stator of a three-phase motor is a common multiple of or equal to the number of the magnets at the rotor of the rotor, a cogging torque will be produced when starting the rotor. This drawback shortens the service life of the motor, and affects the performance of the motor. During operation of the motor, high heat may be produced, causing the related Hall ICs to be burned out.

SUMMARY OF THE INVENTION

The present invention provides a vehicle motor for a motor bicycle which eliminates the aforesaid problems. According to one aspect of the present invention, the rotor and the stator are well matched to eliminate a cogging torque during rotary motion of the rotor relative to the stator, so that neither starting dead angle nor noise are produced during the operation of the motor. According to another aspect of the present invention, a Hall IC set is provided having three Hall ICs mounted on a circuit board for direction change detection, and disposed at the best position to match with a three-phase winding, so as to minimize power consumption. According to still another aspect of the present invention, a thermal control IC is installed in one of the three electric wires of the three phase winding to protect the motor. The thermal control IC automatically cuts off power supply from the motor when the temperature of the motor surpasses a predetermined value, or returns the supply of electric power to the motor when the temperature of the motor drops below predetermined value. The operation of the thermal control IC prevents the Hall ICs from being burned out, and the insulator of the electric wires from being damaged by heat. The operation of the thermal control IC also prevents a loss of magnetic force.

DETAILED DESCRIPTION OF THE PREFERRED EMBODIMENT

Figure 1:
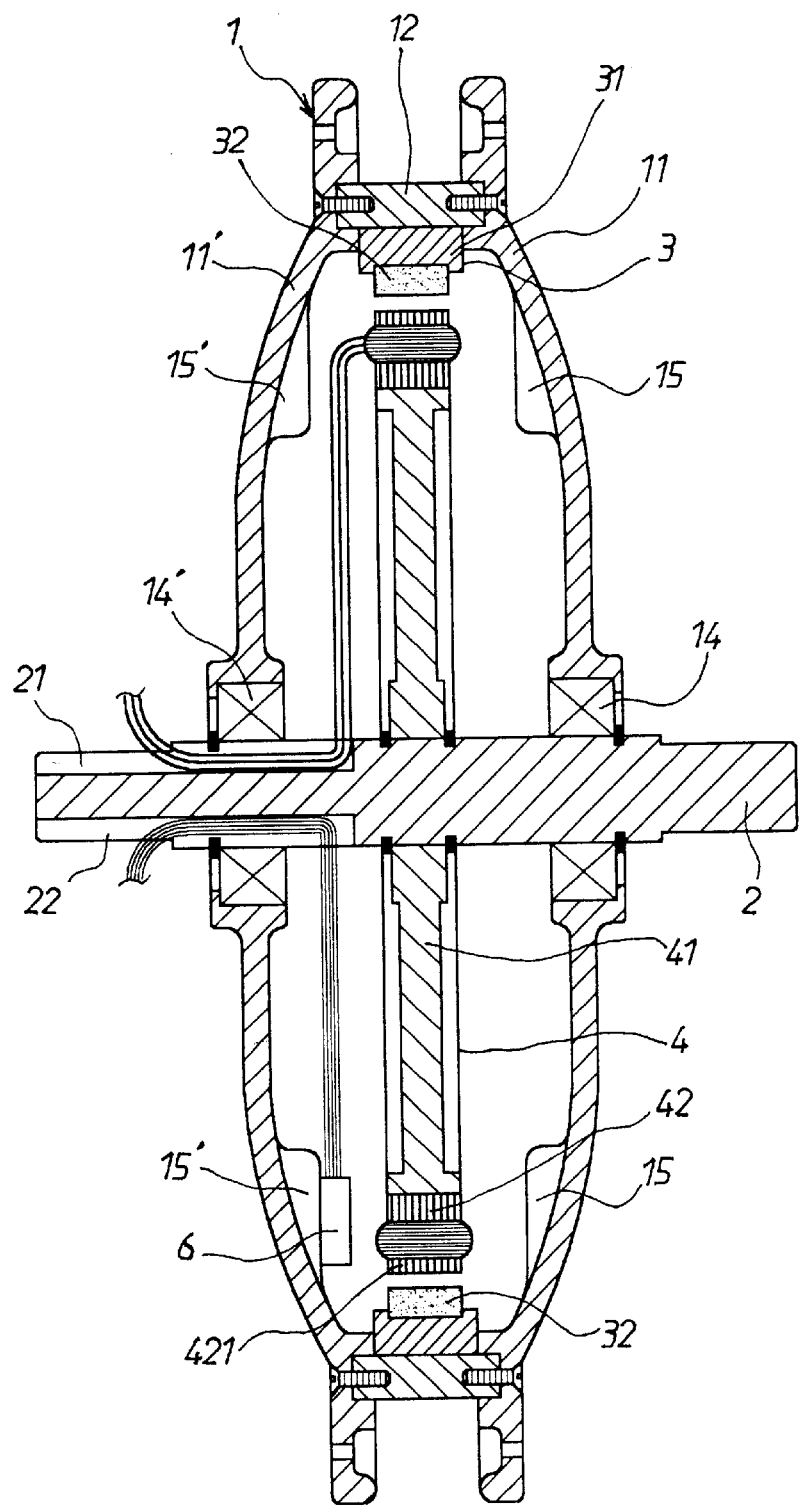
FIG. 1 is a sectional assembly view of a vehicle motor according to one embodiment of the present invention.

Referring to FIG. 1, a vehicle motor is designed for installation in the center of a wheel of a motor bicycle, comprised of a wheel hub 1, a wheel axle 2, an annular rotor 3, and a disk stator 4.

The wheel hub 1 is comprised of a ring-shaped casing 12, two cover shells 11 and 11' covered on the ring-shaped casing 12 at two opposite sides and fixedly secured thereto by screws, and two axle bearings 14 respectively mounted on the cover shells 11 and 11' at the center to support the wheel axle 2. The cover shells 11 and 11' each have a plurality of radiating fins 15 and 15' raised from the inside around the border area.

The wheel axle 2 is supported in the axle bearings 14 and 14' and fixedly connected to the front fork of the motor bicycle (see FIG. 2), comprising two longitudinal wire grooves 21 and 22 bilaterally extended to its one end.

The annular rotor 3 comprises a yoke ring 31, and a plurality of magnets 32 equiangularly arranged around the inside wall of the yoke ring 31. One magnet 32 represents one magnetic pole of the rotor 3 (for example, the rotor 3 will have 8 magnetic poles if 8 magnets 32 are installed).

Figure 4:
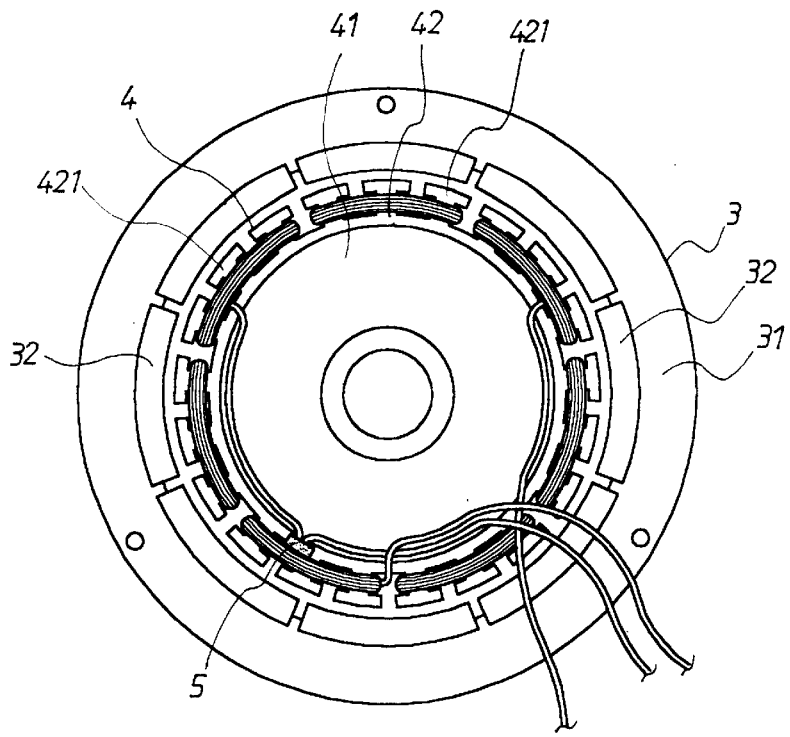
FIG. 4 is a sectional view showing one arrangement of the rotor and the stator according to the present invention.

The disk stator 4 comprises a disk body 41, and a silicon steel stack 42 fixedly mounted around the periphery of the disk body 41. The silicon steel stack 42 has a plurality of grooves around the periphery, forming a plurality T-teeth 421. The number of the T-teeth 421=a common multiple of the number of the magnets 32 of the rotor 3 plus or minus 3 (for example, if the number of the magnets 32 of the rotor 3 is eight, and the number of the T-teeth 421 can be 8×3+/−3=27 or 21). Thus, the number of the T-teeth 421 is not a common multiple of the number of magnetic poles of the rotor 3. A three-phase winding is employed to the T-teeth 421 of the silicon steel stack 42 of the disk stator 4, enabling the disk stator 4 to form a three-phase brushless motor stator. The three-phase winding has three wires for power input. Further, a thermal switch 5 is installed in one wire of the three-phase winding, and fixedly mounted on the disk stator 4 (see FIG. 4).

Figure 8:
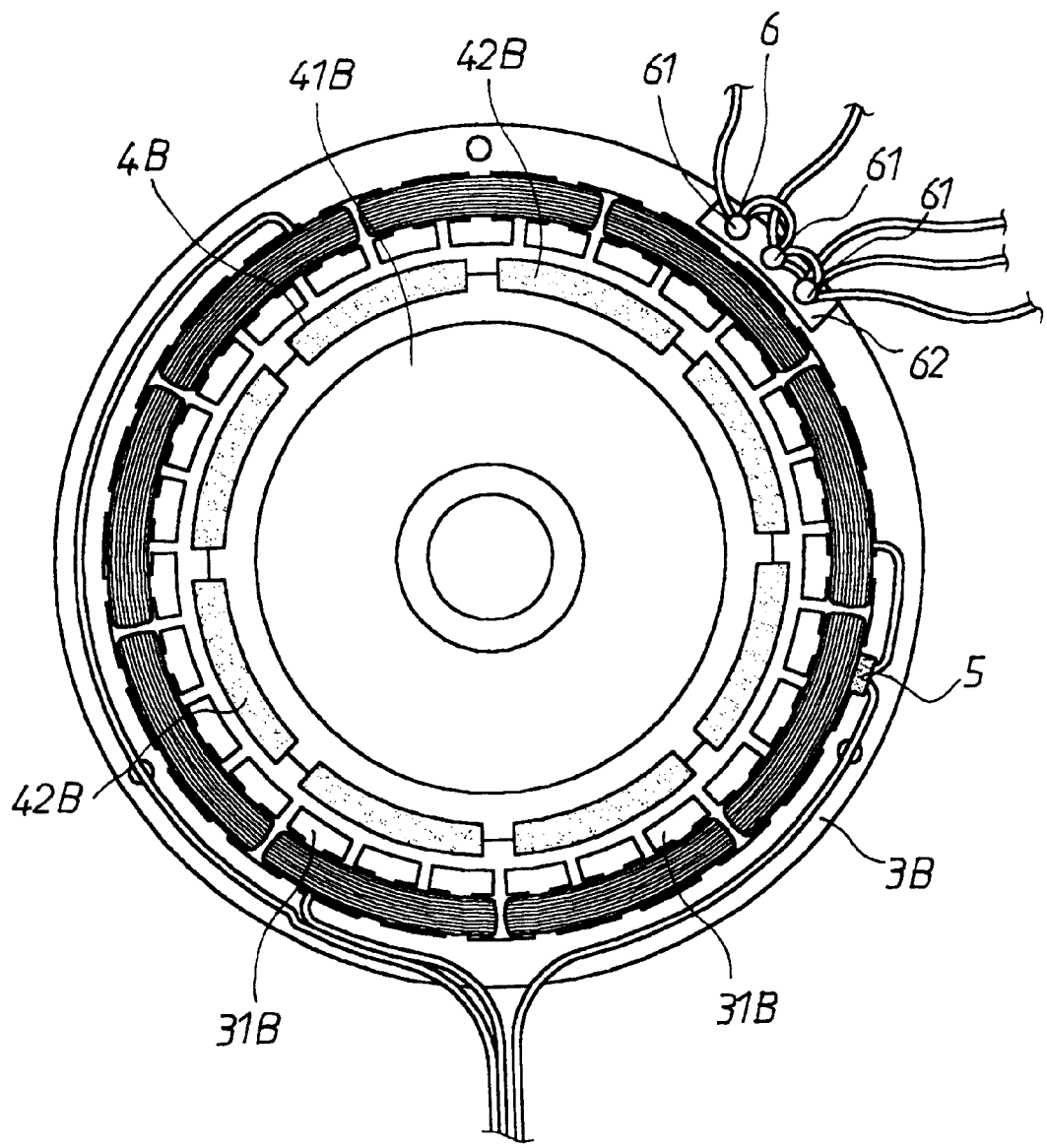
FIG. 8 is a sectional view showing still another alternate form of the arrangement of the rotor and the stator according to the present invention.
Figure 9:
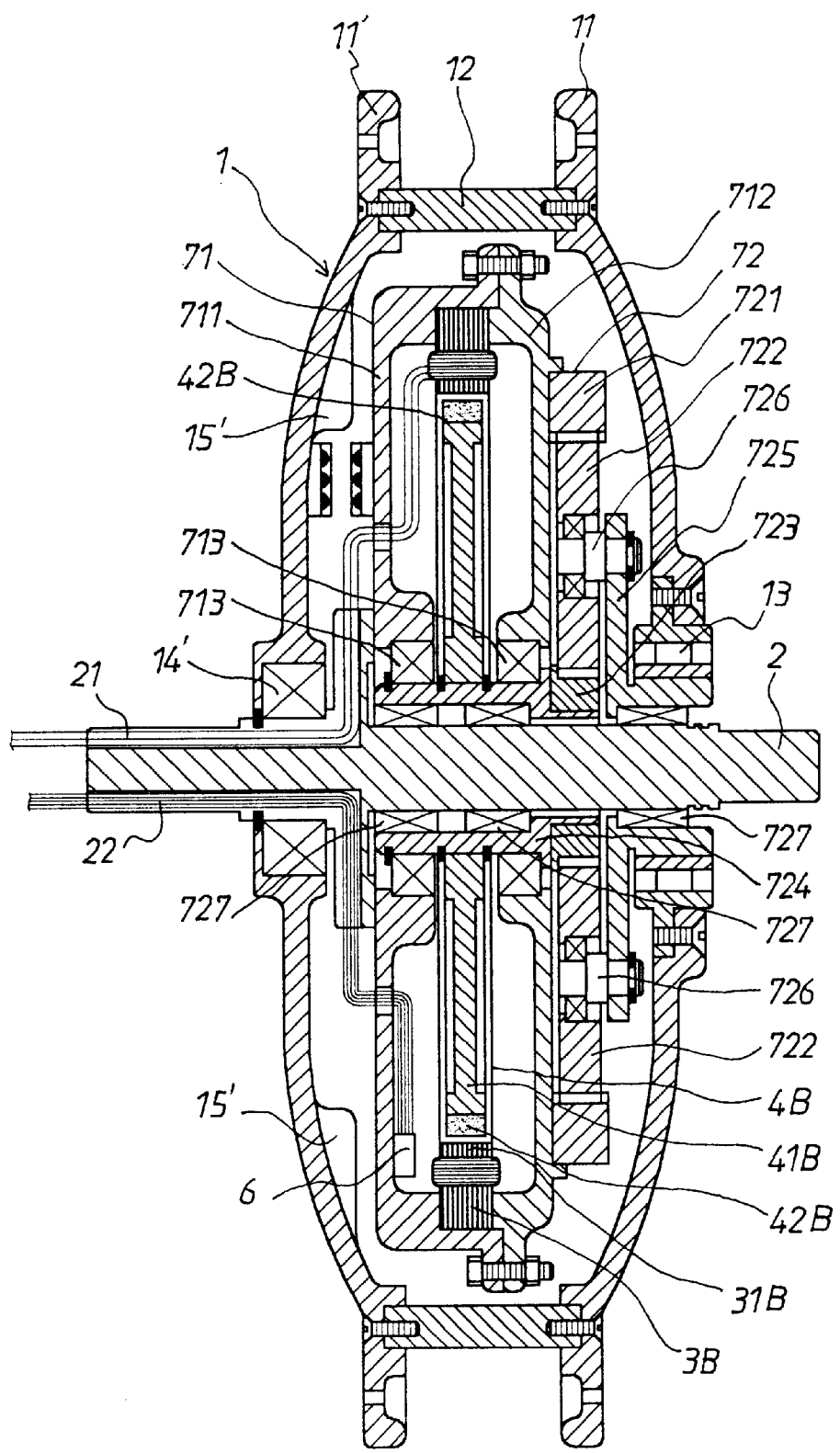
FIG. 9 is a sectional view of another alternate form of the vehicle motor according to the present invention, showing a reducing gear installed in the wheel hub.
Figure 10:
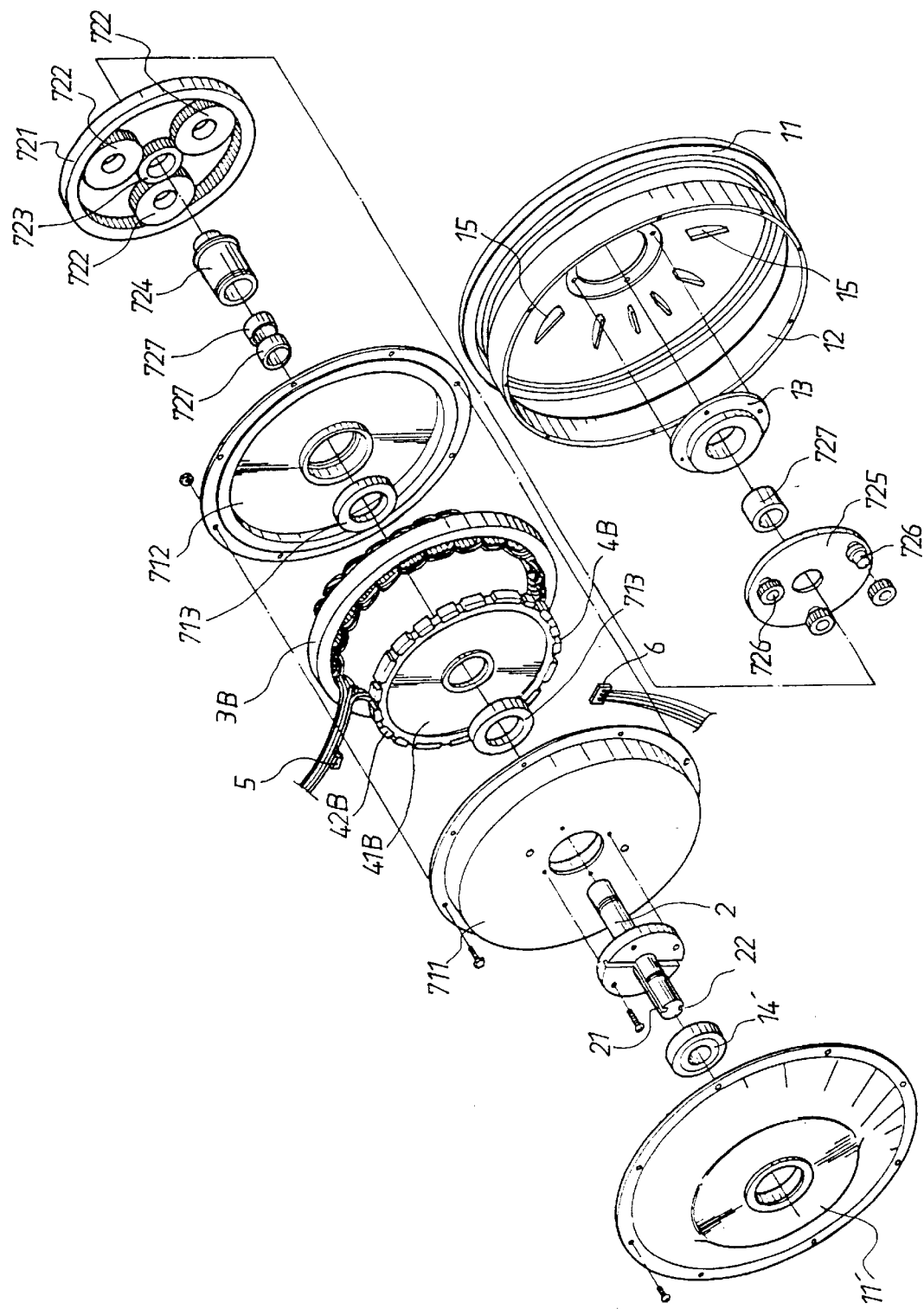
FIG. 10 is a perspective exploded view of FIG. 9.
Figure 11:
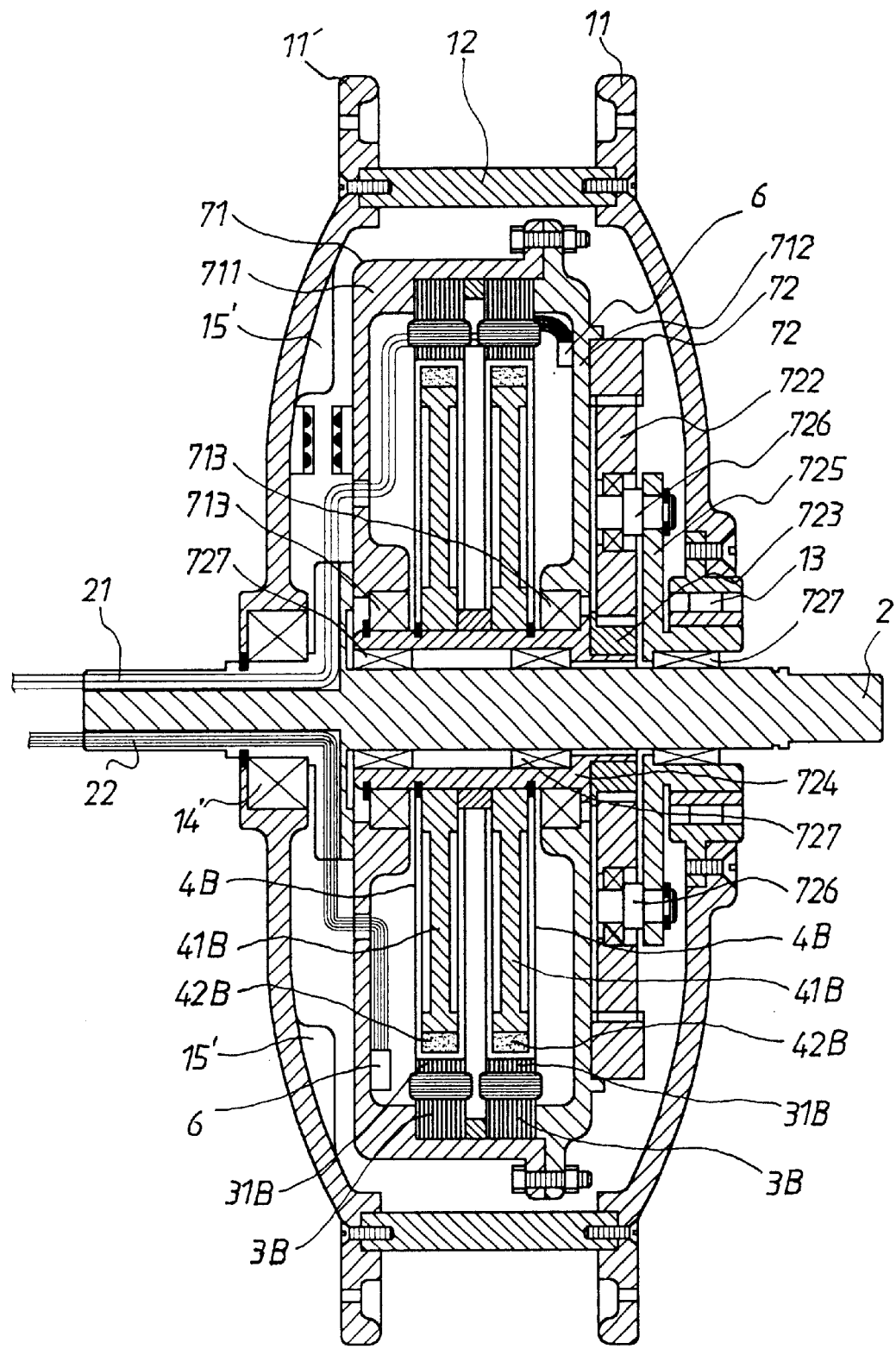
FIG. 11 is a sectional view of still another alternate form of the vehicle motor according to the present invention, showing two rotors and two stators provided inside the wheel hub and a reducing gear installed in the wheel hub.

Referring to FIG. 1 again, the rotor 3 is fixedly mounted on the inside wall of the ring-shaped casing 12 of the wheel hub 1. The disk body 41 of the disk stator 4 is fixedly mounted on the wheel axle 2, and suspended inside the wheel hub 1 within the rotor 3, enabling a gap to be maintained between the rotor 3 and the silicon steel stack 42. The cover shells 11 and 11' are supported on the wheel axle 2 by the axle bearings 14 and 14', and fixedly fastened to the ring-shaped casing 12 at two opposite sides to hold down the rotor 3, enabling the rotor 3 to be rotated with the wheel hub 1 relative to the disk stator 4 and the wheel axle 2. The three wires of the disk stator 4 are extended out of the longitudinal wire grooves 21 at the wheel axle 2 to the outside of the wheel hub 1. Further, a Hall IC set 6 is installed in the wheel hub 1. The Hall IC set 6 is comprised of a circuit board 62 fixedly mounted on the wheel hub 1, and three Hall ICs 61 mounted on the circuit board 62 (see FIG. 8) to detect direction change time serial signal. The Hall IC set 6 is provided at the wheel hub 1 at the best starting angle of the motor. After installation of the wheel hub 1 in the wheel of the motor bicycle, the wheel axle 2 is fixedly fastened to the front fork (or rear fork). When electricity is connected to the three phase winding at the disk stator 4, the wheel hub 1 and the rotor 3 are rotated about the disk stator 4, causing the wheels of the motor bicycle to be rotated.

Figure 12:
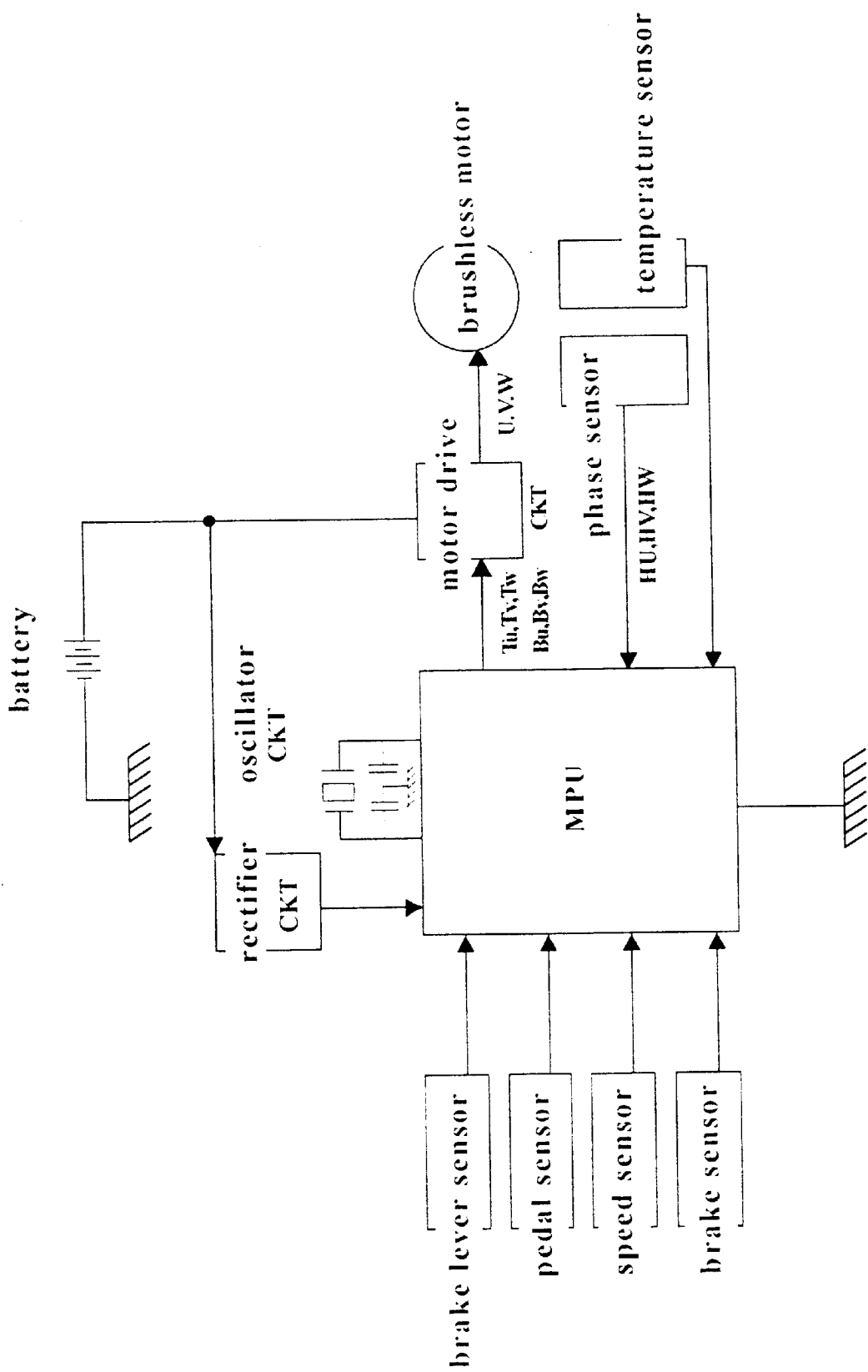
FIG. 12 is a circuit block diagram of a motor control circuit system according to the present invention.

Because the number of teeth of each T-tooth 421 is not a common multiple of the number of magnetic poles of the rotor 3, the magnetic poles of the rotor 3 are never aligned with the center of the magnetic field of the winding of the stator 4. This design eliminates a starting dead angle. When the three-phase winding 4211 receives a message from the MPU (microprocessor unit) to start the motor (see FIG. 12), electricity is provided through the three wires of the three-phase winding 4211 (see Figures from 4 through 7), causing the rotor 3 to be rotated smoothly. During rotary motion of the rotor 3, no cogging torque is produced. Therefore, the operation of the motor is stable, and does not cause much noise or heat.

Figure 2:
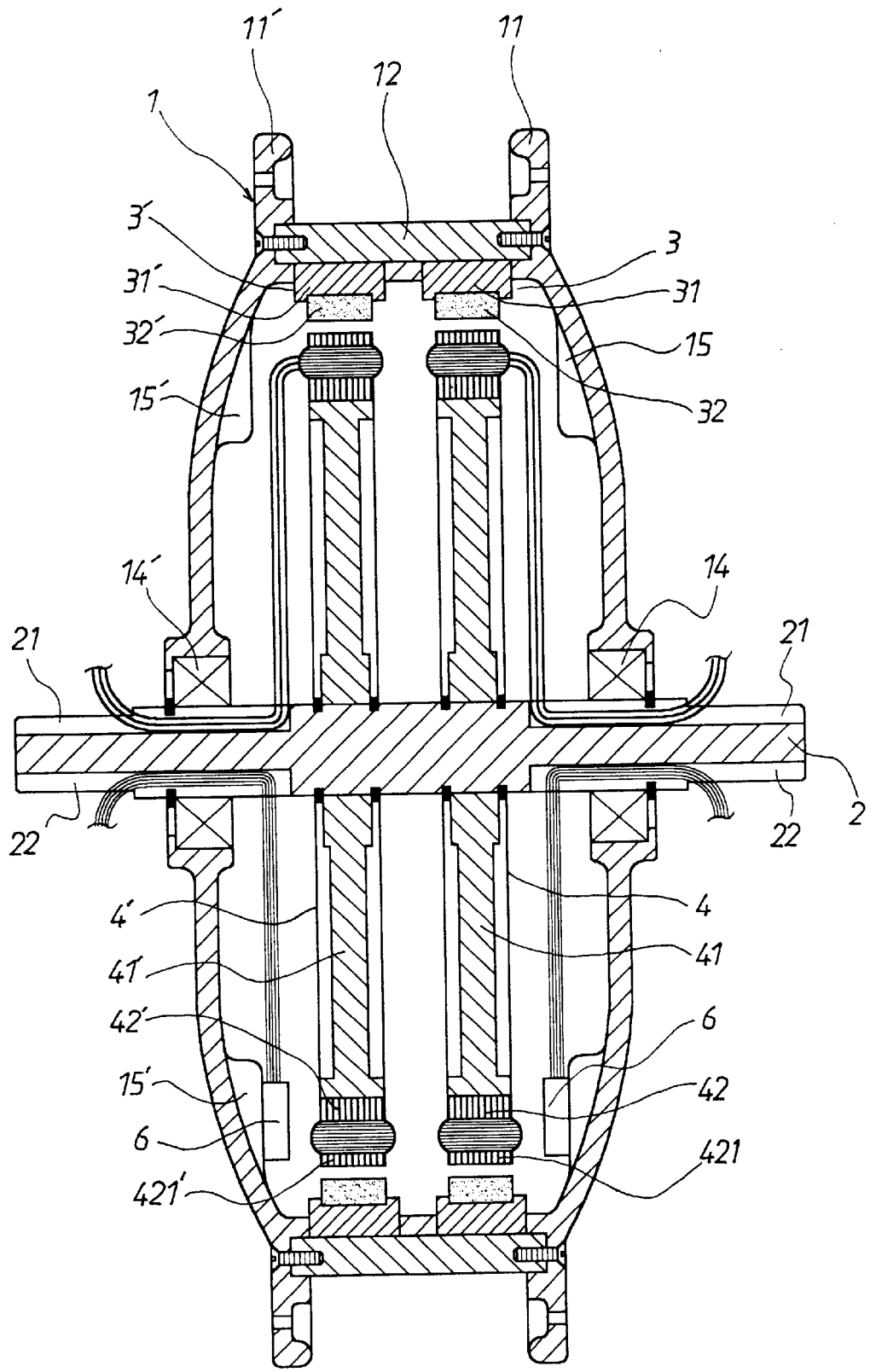
FIG. 2 is a sectional assembly view of an alternate form of the vehicle motor according to the present invention, showing two rotors and two stators provided inside the wheel hub.
Figure 3:
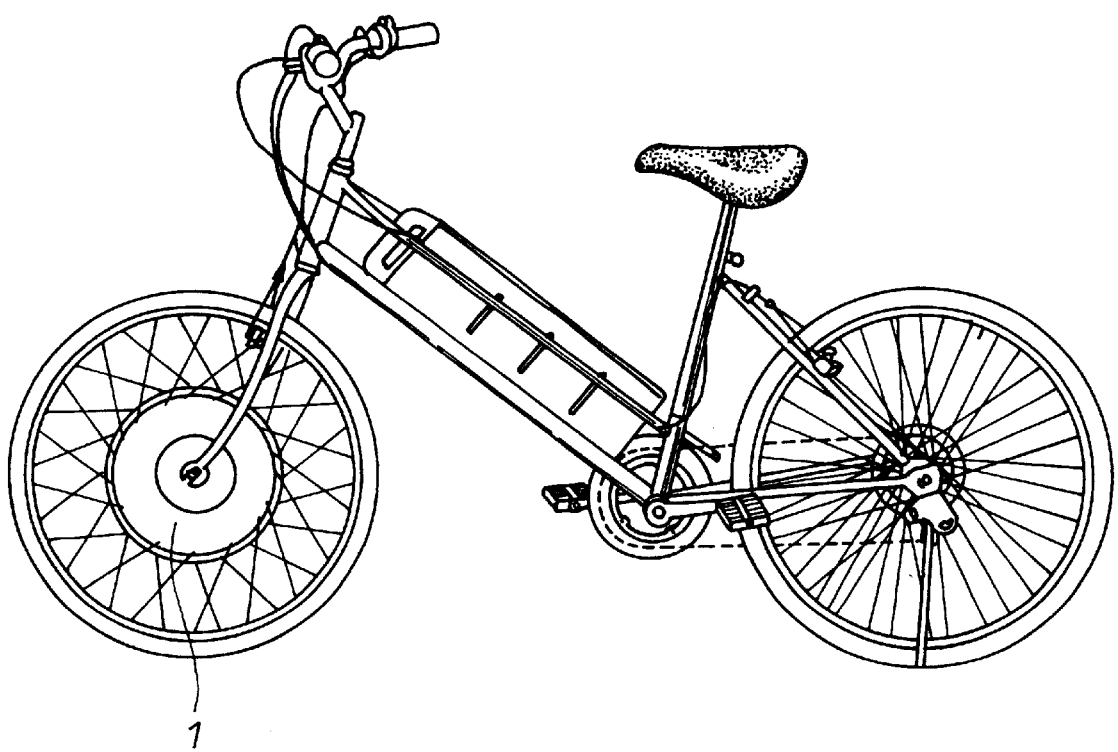
FIG. 3 is an applied view of the present invention, showing the vehicle motor installed in the front fork of a motor bicycle.

FIG. 2 shows an alternate form of the present invention. According to this alternate form, one pair of rotors 3 and 3' are installed in the wheel hub 1 and arranged in parallel, and one pair of disk stators 4 and 4' are fixedly mounted on the wheel axle 2 within the wheel hub 1 to act with the rotors 3 and 3'. The power of the first rotor 3 and first disk stator 4 is, for example, 200W, and the power of the second rotor 3' and second disk stator 4' is, for example, 400W. During operation, the MPU detects the value of the electric current. If the motor bicycle runs over a flat road surface and the detected value of the electric current is below 10A, the MPU drives the first rotor 3 and first disk stator 4 to output power (200W). If the motor bicycle runs over a slope within 4°~6° and the detected value of the electric current is below 20A, the MPU immediately drives the second rotor 3' and second disk stator 4' to output power (400W). If the motor bicycle runs over a slope over 8° and the detected value of the electric current is over 20A, the MPU immediately drives both the first rotor 3 and first disk stator 4 and the second rotor 3' and second disk stator 4' to output power (200W+400W). If the first rotor 3 and first disk stator 4 (or the second rotor 3' and second disk stator 4') are not initialized, the second rotor 3' and second disk stator 4' (or the first rotor 3 and first disk stator 4) drive the first rotor 3 and first disk stator 4 to produce a reversed electric potential for charging the battery of the motor bicycle.

Figure 5:
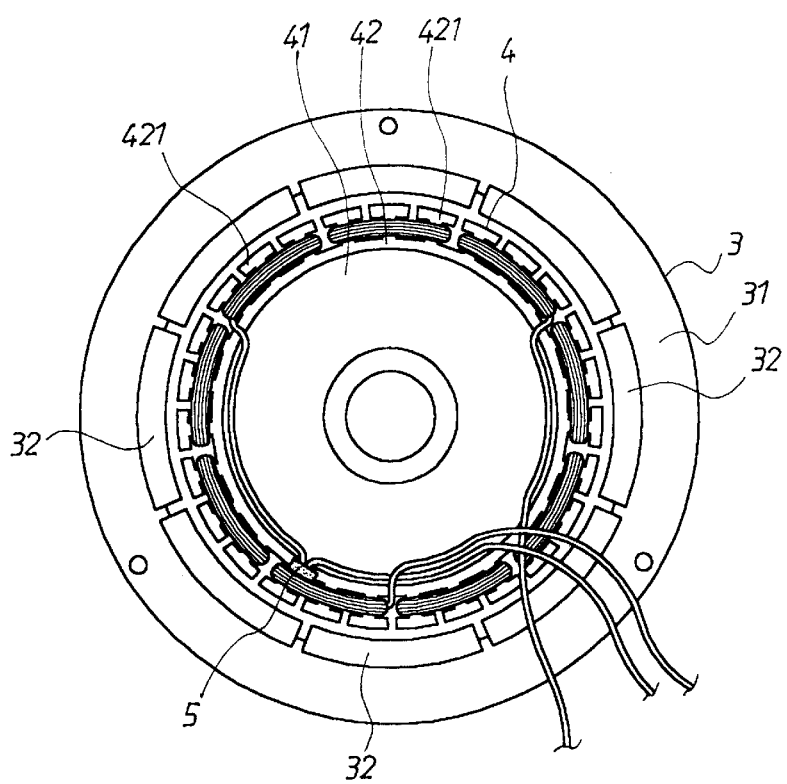
FIG. 5 is a sectional view showing an alternate form of the arrangement of the rotor and the stator according to the present invention.
Figure 6:
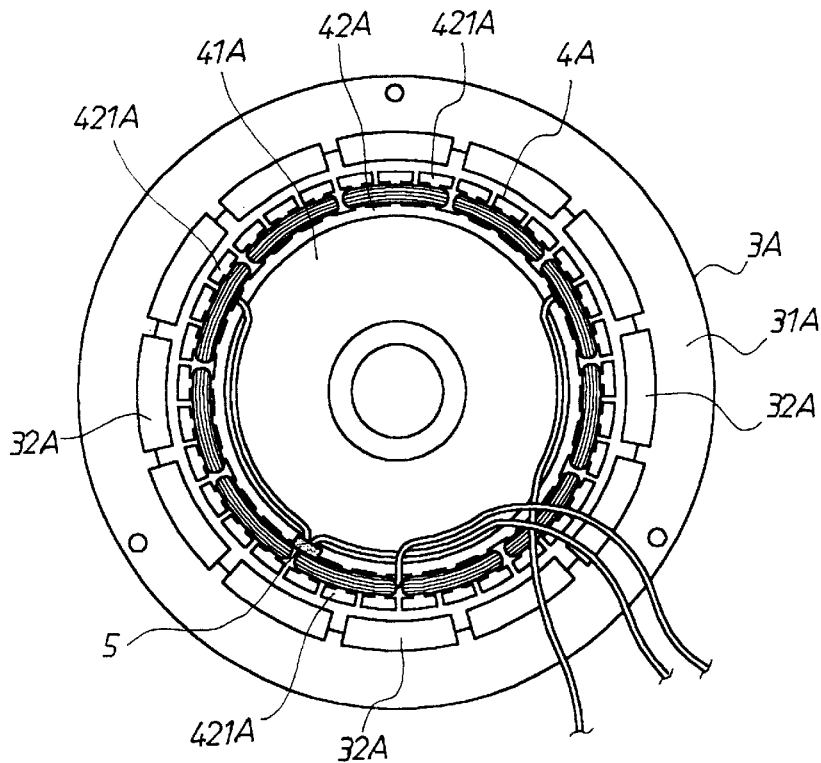
FIG. 6 is a sectional view showing another alternate form of the arrangement of the rotor and the stator according to the present invention.
Figure 7:
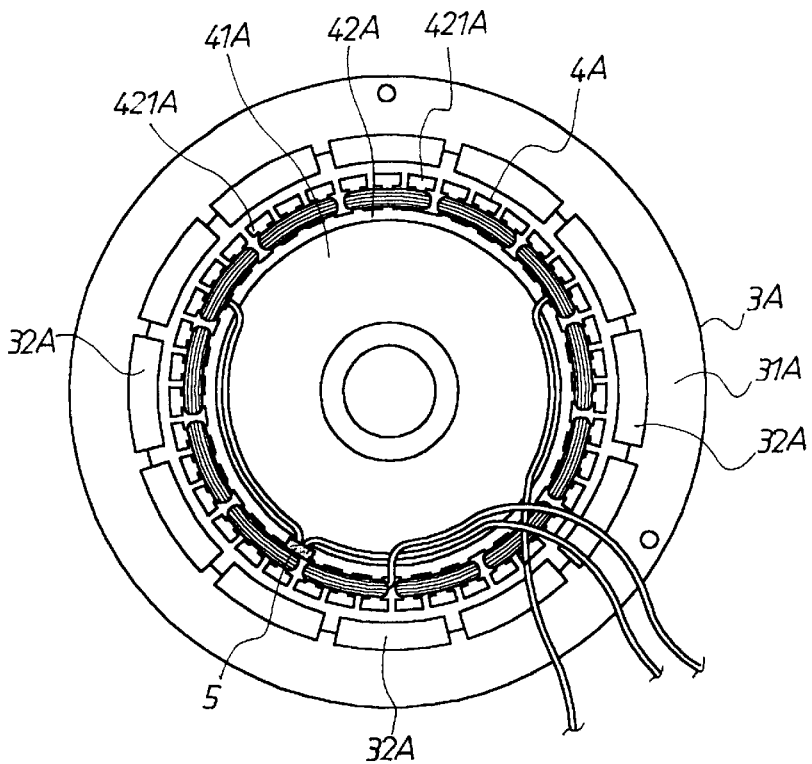
FIG. 7 is a sectional view showing still another alternate form of the arrangement of the rotor and the stator according to the present invention.

As indicated above, the number of teeth of each T-tooth 421 is not a common multiple of the number of magnetic poles of the rotor 3. For example, if the rotor 3 comprises 8 magnets 32, the number of the T-teeth 421 of the disk stator 4 can be 27 or 21 (see FIGS. 4 and 5). In the embodiment shown in FIG. 6 or 7, the rotor 3A comprises 12 magnets 32A, and the number of T-teeth 421A of the disk stator 4A is=12×3+/−3=39 see FIG. 7) or 33 (see FIG. 6). Therefore, these embodiments eliminate a starting dead angle and a cogging torque. In the embodiment shown in FIG. 8, the rotor 3B is formed of a stack of silicon steel plates, having a plurality of T-teeth 31B equiangularly spaced at its inner side, and the disk body 41B of the disk stator 4B has a predetermined number of magnets 42B equiangularly arranged around its periphery. The magnetic poles of the disk stator 4B matches with the T-teeth 31B to eliminate a starting dead angle and a cogging torque, i.e., the number of the T-teeth 31B=a common multiple of the number of the magnets 42B of the disk stator 4B plus or minus 3.

In the embodiment shown in Figures from 9 through 11, a reducing gear 7 is installed in the wheel hub 1 to match with the starting engine(s) (one rotor 3 and one stator 4 form a starting engine). The reducing gear 7 comprises a motor case 71, and a planetary gear set 72. The motor case 71 is comprised of a first cover shell 711 and a second cover shell 712 fastened together by screws. The cover shells 711 and 712 each have an axle bearing 713 at the center. The planetary gear set 72 is comprised of an internal gear 721, at least one, for example, three intermediate gears 722, a main drive gear 723, an axle sleeve 724, a transmission disk 725, and at least one, for example, three pivots 726. The internal gear 721 is fixedly mounted on the outside wall of the motor case 71 at one side. The intermediate gears 722 are respectively mounted on the transmission disk 725 by a respective bearing and pivot 726. The transmission disk 725 has a center hole mounted with one axle bearing 727. The main drive gear 723 is fixedly mounted on one end of the axle sleeve 724, and suspended at the center of the internal gear 721. The axle sleeve 724 has at least one axle bearing 727 mounted on the inside. The intermediate gears 722 are meshed between the internal gear 721 and the main drive gear 723. When the main drive gear 723 is rotated with the axle sleeve 724, the intermediate gears 722 are driven by the main drive gear 723 to make a gyratory motion in the internal gear 721, thereby causing the transmission disk 725 to be rotated to achieve a speed reduction effect. The aforesaid reducing gear 7 may be variously embodied, for example, a two-step reducing gear may be employed.

Referring to Figures from 9 through 11 again, two rotors 3B are fixedly mounted on the second cover shell 712 of the motor case 71 (forming a stator), enabling the three electric wires to be extended out of the motor case 71 through the longitudinal wire grooves 21 at the wheel axle 2 to the control circuit. A Hall IC set 6 is mounted in the second cover shell 712 of the motor case 71 with its electric wires extended out of the motor case 71 through the longitudinal wire grooves 21 at the wheel axle 2 to the control circuit. Two stators 4B are mounted on the axle sleeve 724 of the planetary gear set 72, enabling the axle sleeve 724 and the stator 4B to be rotated on the wheel axle 2 (forming a rotor). The axle sleeve 724 is mounted in the axle bearings 713 at the cover shells 711 and 712 of the motor case 71, enabling the stator 4B (actually, it is a rotor) to be disposed within the rotor 3B (actually, it is a stator). The planetary gear set 72 is disposed at one side of the motor case 71, and the transmission disk 725 is coupled to an one-way ratchet wheel 13 at the wheel hub 1, enabling the motor case 71 to be disposed inside the wheel hub 1, therefore the wheel axle 2 can be rotated by the stator 4B and the planetary gear set 72.

Figure 13:
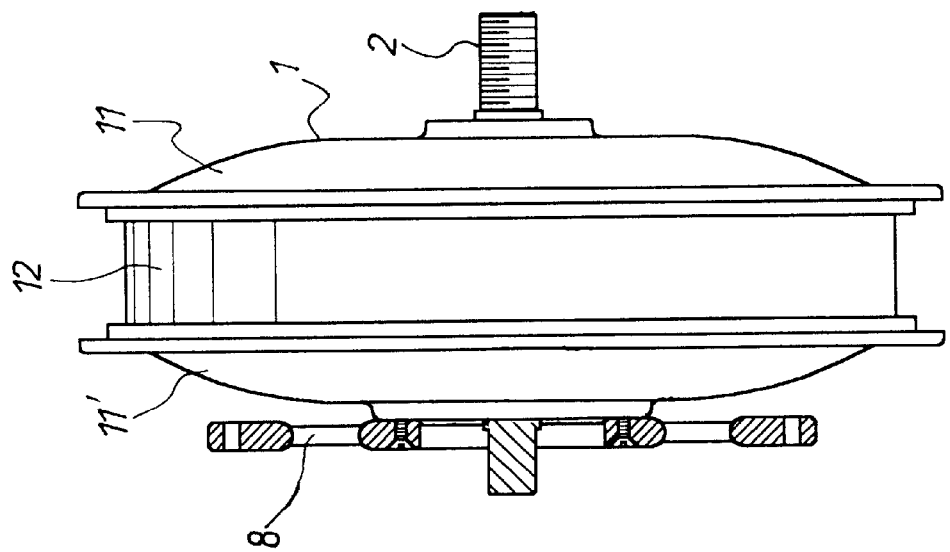
FIG. 13 is a sectional view of still another alternate form of the vehicle motor according to the present invention, showing a disk brake mounted on the wheel hub at one side.

Referring to FIG. 13, a disk brake 8 is fastened to the wheel hub 1 at one side. When the motor bicycle rider operates the brake system, the brake sensor gives a message to the MPU (see FIG. 12), causing the MPU to cut off battery power supply from the motor.

Figure 14:
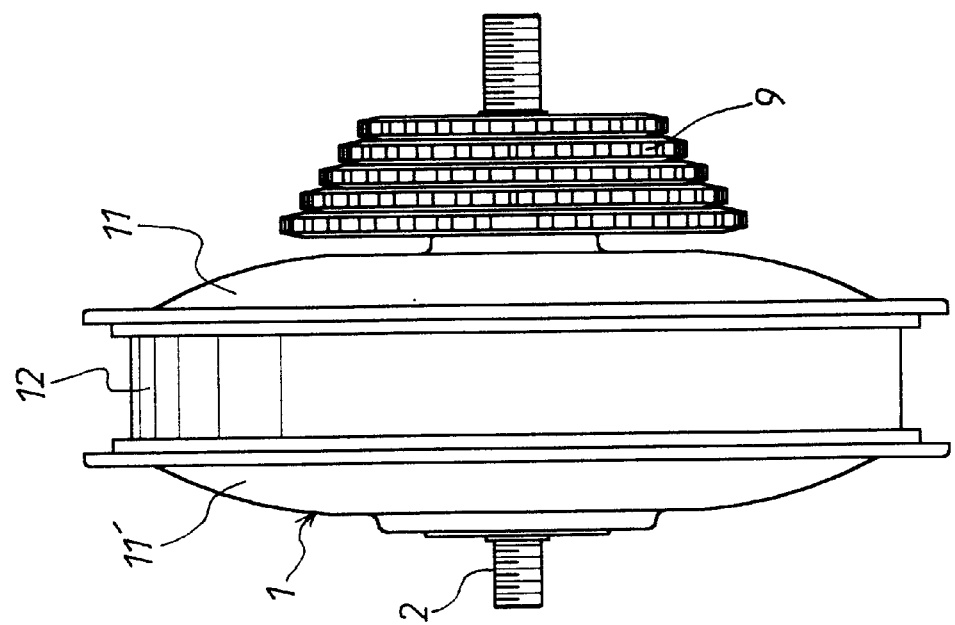
FIG. 14 is a front plain view of still another alternate form of the vehicle motor according to the present invention, showing the rear derailleur mounted on the wheel hub at one side.

Referring to FIG. 14, a rear derailleur 9 may be provided at one side of the wheel hub 1. In this case, the vehicle motor must be installed in the rear fork of the motor bicycle.

Further, a resolver or encoder may be used instead of the aforesaid Hall IC set 6 to detect direction change time serial signal of the brushless motor. Alternatively, reversed electric potential cycle signal of the motor may be used instead of the detection of direction change time serial signal of the Hall IC set 6.

It is to be understood that the drawings are designed for purposes of illustration only, and are not intended as a definition of the limits and scope of the invention disclosed.

What the invention claimed is:

1. A vehicle motor installed in the center of a wheel of a motor bicycle and controlled to rotate the wheel of the motor bicycle, the vehicle motor comprised of a wheel hub, a wheel axle, at least one annular rotor, and at least one disk stator, wherein:
    said wheel hub is comprised of a ring shaped casing, two cover shells covered on the ring shaped casing at two opposite sides and fixedly secured thereto by screws, and two axle bearings respectively mounted on said cover shells at the center to support said wheel axle;
    said wheel axle is supported in said axle bearings and inserted through said at least one disk stator and said wheel hub, and fixedly connected to the front fork (or rear fork) of the motor bicycle;
    said at least one annular rotor each comprises a yoke ring fixedly connected between said cover shells of said wheel hub within said ring-shaped casing, and a plurality of magnets equiangularly arranged at said yoke ring at an inner side;
    said at least one disk stator each comprises a disk body fixedly mounted on said wheel axle and suspended inside said wheel hub within said at least one annular rotor, a silicon steel stack fixedly mounted around the periphery of said disk body, said silicon steel stack comprising a plurality of T-teeth wherein a three-phase winding is mounted on said T-teeth of the silicon steel stack of said at least one disk stator;
    said T-teeth of said at least one disk stator consist of a range of a number that is: T=(M*N)+/−3, wherein T is a number of T-teeth of said at least one disk stator, M is a number of magnets of said at least one annular rotor, and N is an integer number.

2. The vehicle motor of claim 1 wherein the number of said at least one annular rotor is 2, and the number of said at least one disk stator is 2.

3. The vehicle motor of claim 1 wherein said wheel axle comprises two longitudinal wire grooves extended to one end thereof at two opposite sides.

4. The vehicle motor of claim 1 further comprising a reducing gear installed in said wheel hub, said reducing gear comprising a motor case, and a planetary gear set, said motor case comprising a first cover shell and a second cover shell fastened together by screws, and two axle bearings respectively provided at the center of each of the first cover shell and second cover shell of said motor case and supported on said wheel axle, said planetary gear set comprised of an internal gear, at least one intermediate gears, a main drive gear, an axle sleeve, a transmission disk, a ratchet wheel, and at least one pivot, said internal gear being fixedly mounted on said motor case on the outside, said at least one intermediate gear being respectively mounted on said transmission disk by a respective bearing and pivot, said ratchet wheel being fixedly mounted on said wheel hub to hold said transmission disk in place and to limit rotary direction of said transmission disk, said transmission disk having a center hole mounted with one axle bearing being supported on said wheel axle, said main drive gear being fixedly mounted on one end of said axle sleeve and suspended at the center of said internal gear, said axle sleeve being supported on said wheel axle by at least one axle bearing, said at least one intermediate gear being respectively meshed between said internal gear and said main drive gear.

5. The vehicle motor of claim 1 further comprising a Hall IC set mounted inside said wheel hub, said Hall IC set comprising a circuit board fixedly mounted on said wheel hub, and three Hall ICs mounted on said circuit board to detect direction change time serial signal.

6. The vehicle motor of claim 1 further comprising a resolver mounted inside said wheel hub to detect direction change time serial signal.

7. The vehicle motor of claim 1 further comprising an encoder mounted in said wheel hub to detect direction change time serial signal.

8. The vehicle motor of claim 1 wherein a reversed electric potential cycle signal of a control circuit, which controls the operation of the motor bicycle is used to detect direct change time serial signal.

9. The vehicle motor of claim 1 wherein said at least one annular rotor is formed of a stack of silicon steel plates, having a plurality of T-teeth equiangularly spaced at an inner side thereof, and the disk body of said at least one disk stator has a predetermined number of magnets equiangularly arranged around the periphery thereof, and a three-phase winding mounted on said T-teeth.

10. The vehicle motor of claim 1 further comprising a thermal switch installed in one wire of said three-phase winding and fixedly mounted on said at least one disk stator.

11. The vehicle motor of claim 1 wherein said wheel hub has a disk brake mounted on an outside wall thereof at one side.

12. The vehicle motor of claim 1 wherein said wheel hub is mounted on the rear fork of the motor bicycle, having a rear derailleur mounted on an outside wall thereof at one side.

13. The vehicle motor of claim 1 further comprising a thermal switch installed in one of three wires, which are connected to said at least one disk stator to provide a predetermined working voltage to said at least one disk stator, and fixedly mounted on said at least one disk stator.

* * * * *